United States Patent [19]

Lebizay et al.

[11] Patent Number: 5,038,343
[45] Date of Patent: Aug. 6, 1991

[54] HIGH SPEED DIGITAL PACKET SWITCHING SYSTEM

[75] Inventors: Gerald Lebizay, Vence; Michel Demange, Saint Jeannet; Andrzej Milewski, Saint Paul; Alain Vedrenne, Cannes, all of France

[73] Assignee: International Business Machines Corporation, Armonk, N.Y.

[21] Appl. No.: 541,428

[22] Filed: Jun. 20, 1990

[30] Foreign Application Priority Data

Jun. 29, 1989 [EP] European Pat. Off. ........ 89480103.4

[51] Int. Cl.⁵ ...................... H04Q 11/04; H04L 12/56
[52] U.S. Cl. ......................................... 370/60; 370/54; 370/94.1
[58] Field of Search ................. 370/60, 94.1, 54, 94.3, 370/92

[56] References Cited

U.S. PATENT DOCUMENTS

| | | | |
|---|---|---|---|
| 4,656,622 | 4/1987 | Lear | 370/60 |
| 4,696,000 | 9/1987 | Payne | 370/60 |
| 4,761,780 | 8/1988 | Bingham et al. | 370/60 |
| 4,817,084 | 3/1989 | Arthurs et al. | 370/94.1 |
| 4,821,258 | 4/1989 | Fraser | 370/60 |

FOREIGN PATENT DOCUMENTS 0183592 8/1985 European Pat. Off. .

OTHER PUBLICATIONS

IBM Technical Disclosure Bulletin, vol. 28, No. 6, 11-85, pp. 2633-2634.

Primary Examiner—Douglas W. Olms
Assistant Examiner—H. Kizou
Attorney, Agent, or Firm—Joscelyn G. Cockburn

[57] ABSTRACT

A 3-stage switching system is provided for generating, i.e. finding, reserving and setting, path from one switch entrance port (1) to at least one switch exit port (transmit side) for asynchronously received and buffered data cells. While an Nth cell is being transferred, control means (36) generate a control word including the switch exit port address for cell (N+1)th to be subsequently transferred. Said control word is used to find and reserve a path through the switch on a stage-by-stage basis, and then set said path, if any, using a fed back acknowledgement. The (N+1)th cell path generation is performed during cell N transfer, on a cycle stealing basis.

13 Claims, 10 Drawing Sheets

HIGH SPEED DIGITAL PACKET SWITCHING SYSTEM

FIELD OF INVENTION

This invention deals with systems for controlling packet switching throughout a digital communication network.

BACKGROUND OF THE INVENTION

The flow of data currently being exchanged between end-users attached to digital networks are rapidly increasing and soon leading to saturation of presently available communication networks.

Also contributing to jamming the flow of data throughout the network are the so called integration techniques whereby voice or video derived data are merged with pure data to be transferred over same network facilities.

Conventionally, once sampled and digitally encoded voice and video signals provide bit streams (i.e. data) not fundamentally different from pure data. They can therefor use the same communication means to be transported from one location to another over the network. Said networks are often rather complex, with concentrating nodes all over, said nodes including communication controllers managing data transfers.

To that end data are often arranged into cells, i.e. fixed length packets.

Each cell individually includes two different types of data. One relating to the very information to be conveyed from one end user to another; the other including "service" data for orienting the former defined information data throughout the network and for controlling and checking any packet loss. Thus, generally speaking, each cell would include an information field and a so called header field.

Different approaches have been used for organizing the data transfer network architecture. Some architectures involve checking for data integrity at each network node, thus slowering the data transfer. Others are essentially looking for high speed data transfer. The present invention belongs essentially to the latter. To that end, one needs developing high performance switching techniques, wherein flowing packets are switched within the nodes and towards their final destination at the highest possible rate.

Known techniques for designing said switching systems provide more or less flexible and efficient structures.

SUMMARY OF INVENTION

This invention enables a fairly fast switching system structure, based on a modular switch structure provided with means for pre-setting data packets path throughout switching nodes on a cycle stealing basis.

This invention deals with data transfer means and more particularly addresses multistage means for preparing (i.e. finding and reserving), during transfer of an Nth data cell, the path for the (N+1)th cell, through control word processing, on a stage-by-stage basis; acknowledging progressively the prepared path down to last stage; and, finally, validating (i.e. setting or marking) the reservation of said (N+1)th path.

Further objects, characteristics and advantages of the present invention will be explained in more details in the following, with reference to the enclosed drawings which represent a preferred embodiment thereof.

DETAILED DESCRIPTION OF THE PREFERRED EMBODIMENT

Figure 1:
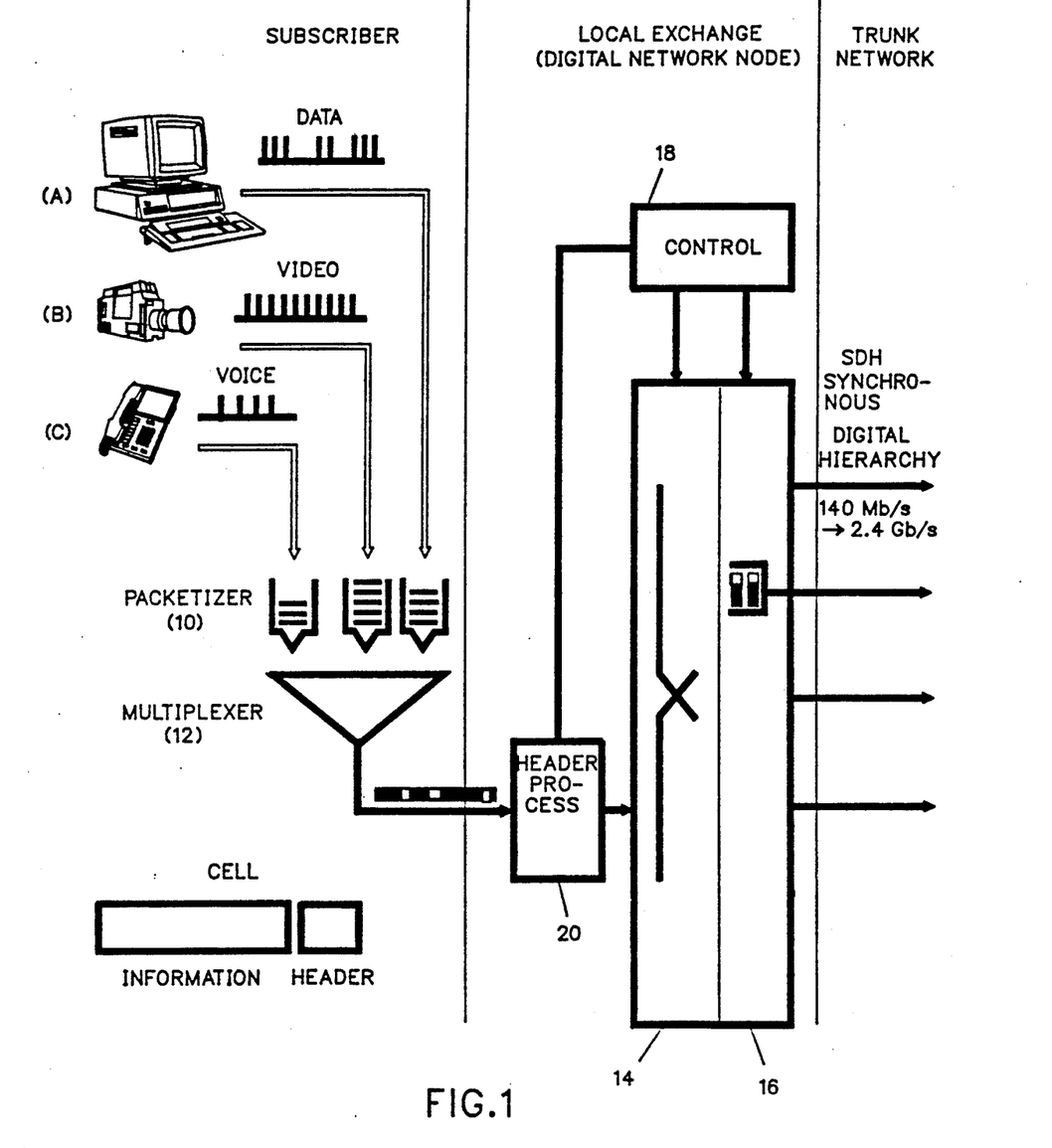
FIG. 1 is a schematical representation of a system to include the invention.

Represented in FIG. 1 is a system illustrating Asynchronous Transfer Mode (ATM) switching principles. As shown therein, end-users (subscribers) may include data source terminals (A) as well as video (B) and voice (C) terminals. For both video or voice terminals, the originally generated analog signal would be sampled and digitally encoded prior to being fed into the network. Then, resulting data from terminals A, B and C are individually packetized by assembling several bytes into a longer, e.g. fixed length, packet with flag delimiters. The individual packets are buffered by being enqueued in packetizers (10).

Figure 2A:
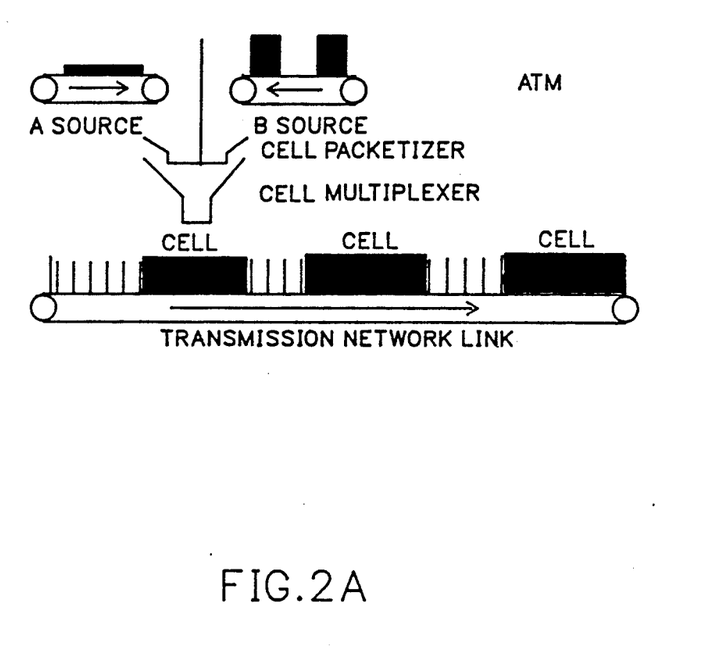
FIGS. 2A and 2B shows data arrangements for the invention.
Figure 2B:
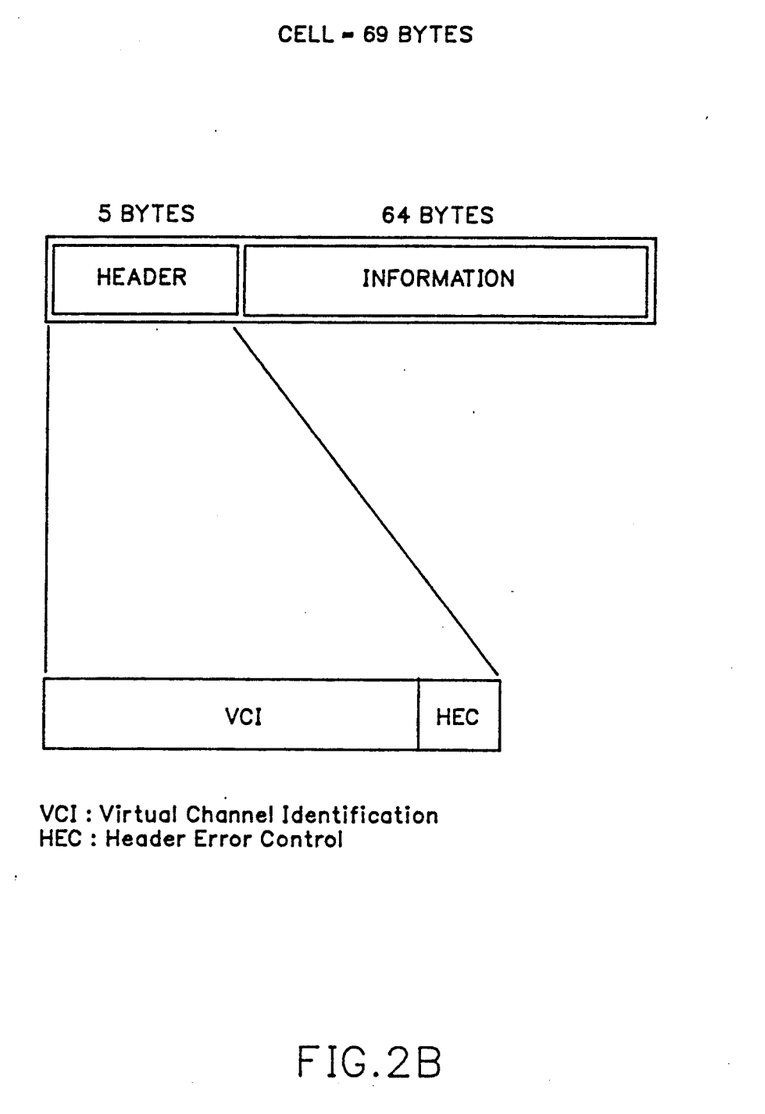

As also illustrated in FIG. 2A, several cells from different sources (e.g. a source A and a source B) and to be oriented through a common destination network node, may be multiplexed together (in 12) to be forwarded towards the transmission network link (or trunk). Represented in FIG. 2B is a 69 bytes long cell including 64 information bytes and 5 header bytes.

When fed into a local exchange node, each cell, applied to a node port, is oriented through a switching device (14) (SWITCH) and then multiplexed again (16) into a high speed (e.g. 10 Mb/s to 2.4 Gb/s) trunk network towards next network node and down to corresponding respective destinations.

Switching over the device (14) is controlled in (18) through header analysis based process performed in (20).

Figure 3:
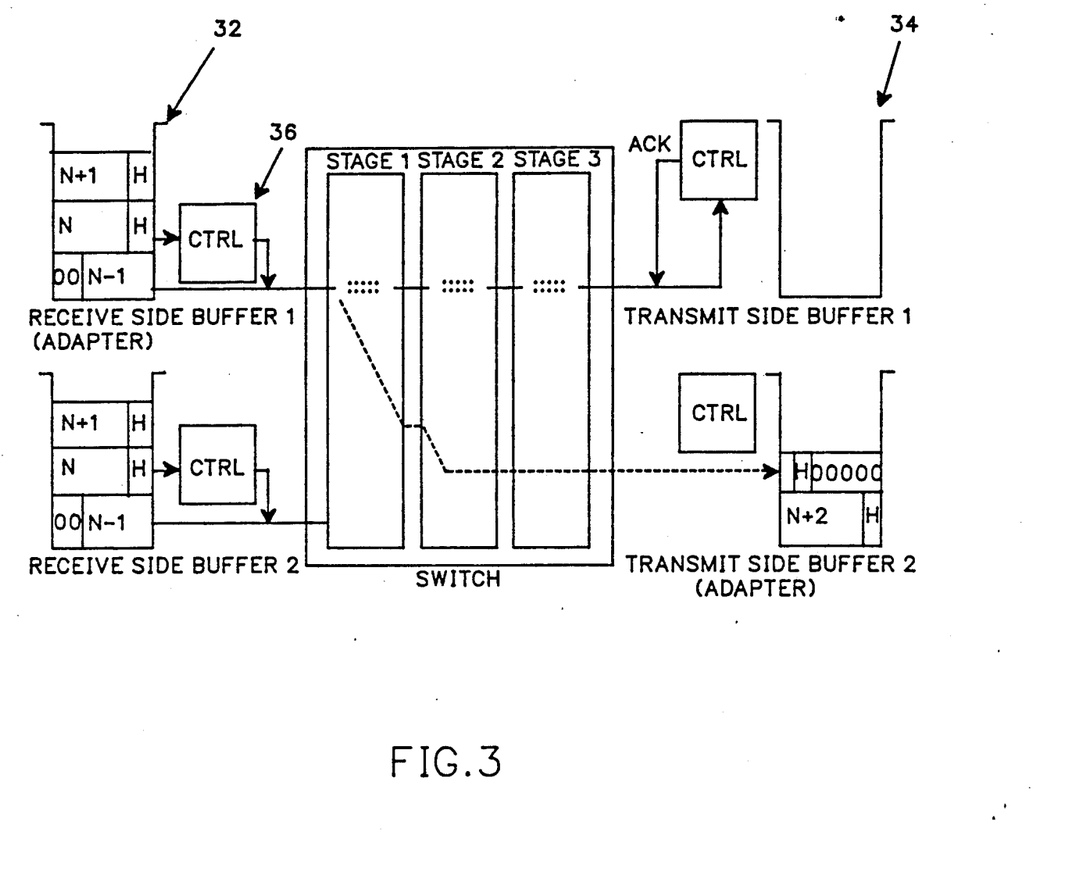
FIG. 3 shows an architecture for implementing the invention.
Figure 5:
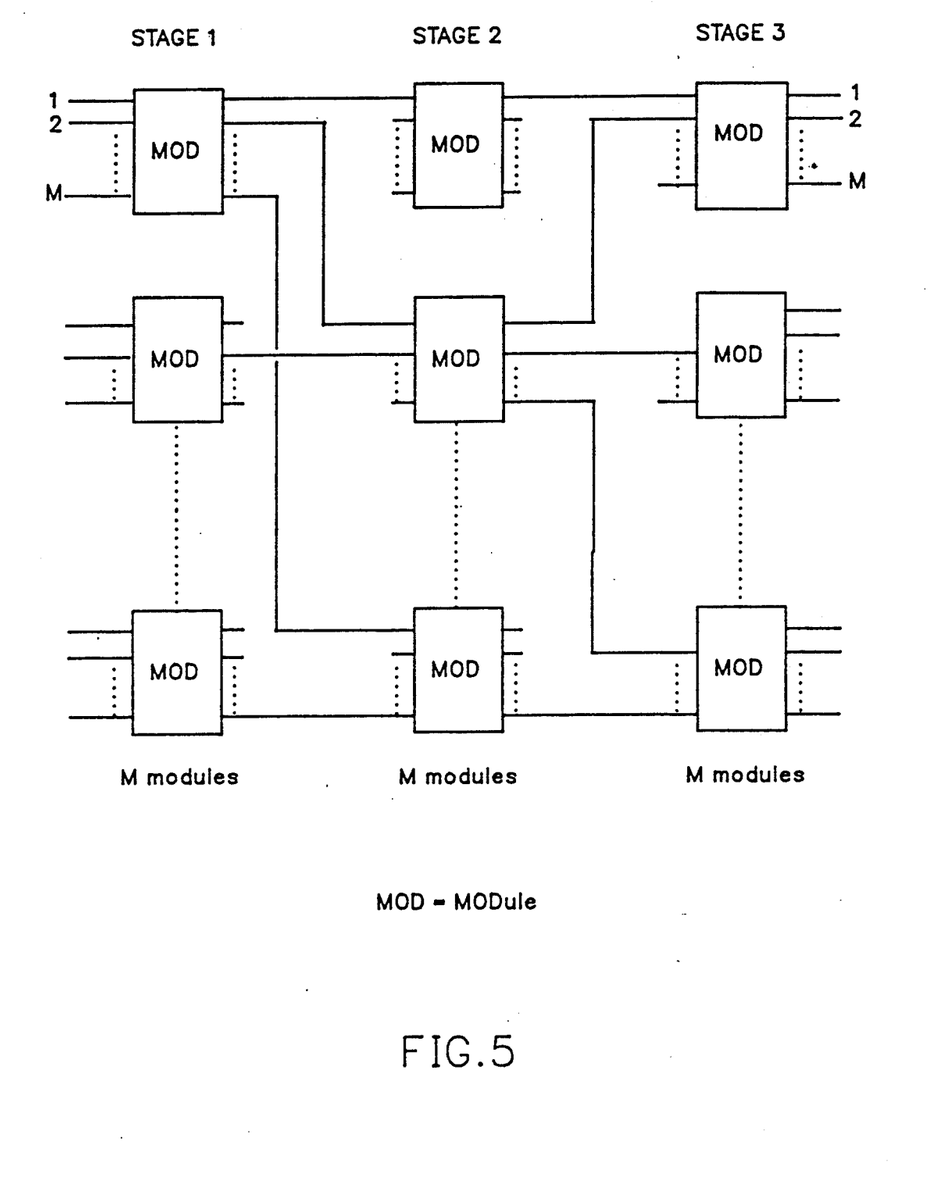
FIG. 5 is a block diagram showing the modular approach to the invention.

This invention provides a flexible architecture for switching system (14) and control means (18, 20), which could support both small or large switching capacities. To that end, the switching system has been given a modular architecture as shown in FIGS. 3 and 5.

The modules are arranged into switch stages (e.g. three stages) and data transfer throughout the switch involves marking a path within each stage from any Receive buffering means or adapter attached to a switch entrance port, to a Transmit Adapter buffering means attached to a switch exit port, for each incoming data cell. The incoming data cells, buffered into the receive adapter (32) individually assigned to a switch entrance port (1) are sequentially numbered N−1, N, N+1, N+2, . . . Outgoing data cells are buffered into the transmit adapters (34) individually assigned to the switch exit ports. The receive adapter means, are provided with control means (36 within control 18). These control means help generate a control word for progressively finding and reserving a path for each cell through the switch, then acknowledging (validating) and marking (setting) said path.

Figure 4:
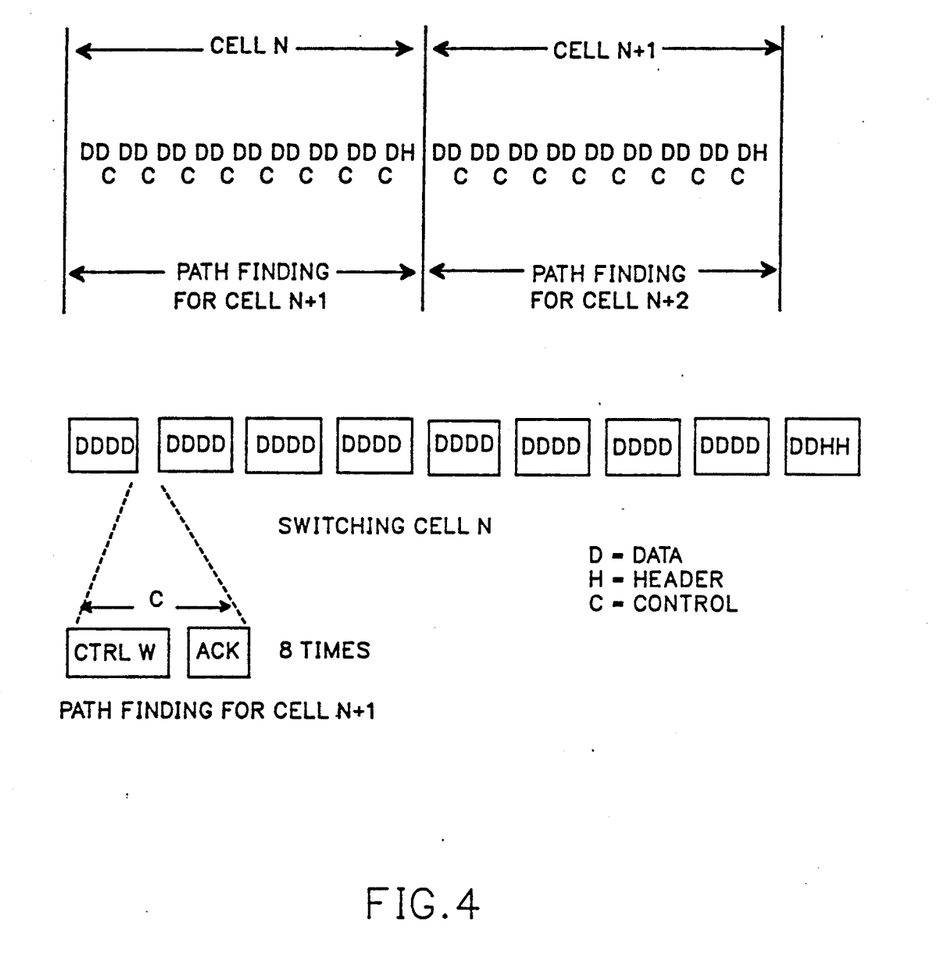
FIG. 4 illustrates the cycle stealings for the invention.

High speed data transfer is achieved on a pipeline basis involving cycle stealing operations as illustrated with reference to FIG. 4. While cell number N data are being transferred, the control means perform a path generation for the (N+1)th data cell buffered within same receive adapter. To that end, said control means are made to steal cycles (e.g. up to M=8 control phases per cell cycle for instance) and insert processing for routing a control word (C) including a pure control word section (CTRLW) and acknowledgment data (ACK/NACK) therein. The control words include the destination address of data cell N+1. The control phases operating on the cycle stealing basis during cell N transfer will tend to find a path for cell N+1 progressively within the three switch stages and get acknowledgements back, thus reserving path on a stage-by-stage basis and ultimately validating and marking the reserved path.

Three different situations may occur. First a path is found down to the switch exit port. The concerned entrance control means gets an acknowledgement (ACK), the path is virtually locked for the (N+1)th cell, and no further control word is then generated within cell N transfer time, unless cell broadcasting is to be performed for (N+1)th cell. By broadcasting, one should understand dispatching a cell to more than one exit port, in which case subsequent control words are used to generate path(s) for cell N+1 down to other exit ports.

Second situation, the path tested within the switch stage 2 is not available. The concerned entrance control word will look for a different path throughout stages 1 and 2 at next control word processing during same cell cycle (if any).

Finally, the last situation, the path is not free through stage 3: this is a failing or a blocking situation. Currently investigated (N+1) cell transfer path finding is momentarily held until next cell processing time. However, the system is made to resume path finding during current cell processing time by selecting a new control word by scanning the entrance queue, to avoid head of time blocking.

Several situations may occur. The entrance queue is able to provide another cell with a destination address different from the held (failing) cell destination address. Said cell is selected for path generation at next control word, and the above described path generating process is repeated. Or the entrance queue is either empty or contains only cells for the failing destination address. Then, no other control word would be processed during current cell transfer cycle.

Obviously, the above considerations are but one way of implementing the path presetting process involving cycle stealing for control words processing forced within the data transfers. It enables however lowering contention chances with a reasonable system complexity.

Further improvements are achieved through a judicious path finding control word routing system. The routing algorithm practiced in the switch first stage has been made different from the routing algorithms for second and third switch stages. At the first stage, the control words are routed within the switch according to a predefined scheme rather than according to their destination address. Said scheme varies at each cell processing cycle, and could even be made variable cyclically within a given cell cycle. The corresponding routing algorithm will be described in more details further. However, to be already noted is the degree of contention avoidance thus achieved at the switch stage 1 level.

For second and third switch stages, the control words are routed according to their destination address. Given the entrance for each destination address, one route, and only one, is defined by the switch structure. This may lead to contention situations, which contentions are resolved on a priority basis. For that purpose, the control word is made to include a priority field (e.g. 2 bits long).

However, assuming several conflicting control words are of same priority level, a second mechanism is called. Said second mechanism or algorithm has been made different for stages 2 and 3.

To enable a better understanding of these mechanisms, one should first refer to FIG. 5 showing a block diagram of the switch device. To be noted is the modular structure adding to the system's flexibility. Each switch stage is made of M modules and each module is an M×M (M entrance and M exit ports) matrix arrangement.

To resolve the above mentioned contentions the entrance ports on stage 2 modules are given a predefined variable priority. Said priority is made to vary at each cell processing cycle on a "round robin" or cyclical basis. To avoid any discrimination among the ports. While the entrance ports of stage 3 modules are given a fixed priority basis. On each module the ports are numbered 1 through M and the priorities decrease according to said numbering on stage 3 modules.

Figure 6:
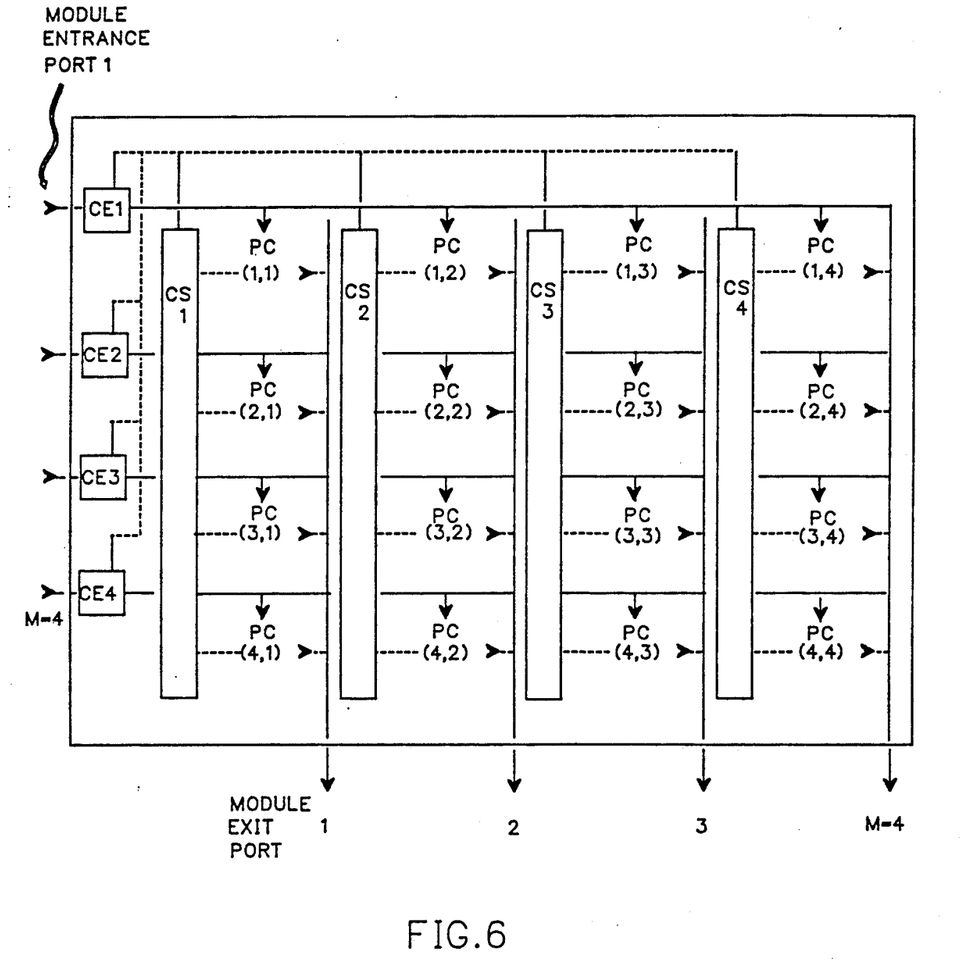
FIG. 6 shows module components for the invention switch.

From a structural viewpoint each module is made according to the design of FIG. 6. The module represented is made of a M=4 by M=4 matrix of cross-point (PC's) referenced PC(i, j) wherein i refers to the module entrance port and j to the module exit port. Each entrance port is provided with an entrance controller (CEi), while each exit port is connected to an exit controller (CSj). Dashed lines are used to indicate connections or controls between CE's, PC's and CS's. As per the cross points, PC(i, j) for $1 \leq i \leq 4$, they are connected to CSj. All CE's and CS's are parts of the switch control means (18).

In operation, each involved CE is fed with a control word. The CE then defines the exit port either according to a predefined scheme (for the modules of stage 1), or based on the control word destination address (for stages 2 and 3 modules). The controller then checks at cycle stealing time defined by the switch control means whether the designated exit port is free. Conflicting situations (contentions) are taken care of by exit controllers (CS). Meanwhile, the control words are stored in the CE's. A conflict may occur within a module, whenever several currently processed module control words bear same destination, i.e. same module exit port is designated in the control word. This is true, except for stage 1 wherein no conflict may occur.

Once a module requested exit port is free and a conflicting situation, if any, resolved, the corresponding control word currently processed is forwarded to next switch stage through said module exit port. In case of successful path finding down to the third stage, the control word is feedback through the selected switch path with an acknowledgement data (ACK) inserted therein by the switch control means. Thus path is found by routing the control word from one stage to the next, said path being temporarily reserved within the stages and then set marked for being used at next cell cycle.

As already mentioned, any concerned stage 2 or 3 CS controller processes the conflicting situations if any. It also temporarily reserves any selected cross-point within the found path. Said CS solves conflictual situations on each module ports by selecting first the control word affected with the highest priority. In case of priority contentions, said CS then elects a winner control word based on input port number, as already mentioned. This is valid only for stages 2 and 3. Initially, at each cell cycle, the CS defines an entrance port to be affected the highest priority. Should said entrance port be requesting service, and should it win the selection based on control word priority bits, said entrance port is selected. Otherwise, priority is given to the next entrance port requesting service and winning selection based on priority bits.

The entrance port affected the highest priority is always the first port on each module for the switch stage 3. The algorithm is a little more complex for stage 2. At first cell cycle, the first entrance port of each module is affected the highest priority. At the xth cell cycle the highest priority is affected to entrance port number x(Modulo M).

A cross point connecting a selected exit port to a requesting entrance port, may be temporarily "reserved" by the corresponding CS. It is then fully reserved and marked, or set, upon reception of a feedback ACK; or freed again by a NACK. It should be noted that in this application, ACK or NACK will be referred to by the generic term acknowledgement data.

As already mentioned, stage 1 modules are made special: stage 1 entrance and exit ports are individually associated to each other according to a predefined scheme. For instance, each incoming control word applied to a stage 1 module entrance port, is oriented towards an exit port according to an algorithm free of any destination address. Accordingly, during first cell cycle, at first control word cycle steal, the ith entrance port is associated to the ith exit port on each stage 1 module. For the xth cell cycle, at first control cycle steal operation, exit ports assignments are rotated to connect the (i+x)modulo M exit port to the ith entrance port. During a control cycle, whenever an entrance port gets a NACK, said entrance port is tentatively assigned first next free exit port, i.e. (i+x+1)th or (i+x+2)th etc . . . and so on during the whole cell cycle being processed. With a NACK-2 (i.e. a NACK from stage 2) the path selection process starts again from stage 1 entrance, using same control word. For NACK-3 an new control word is used.

The various switch elements will now be described in details, assuming a 16×16 ports module implementation. The control word (C) is given the structure shown in FIG. 7.

Figure 7:
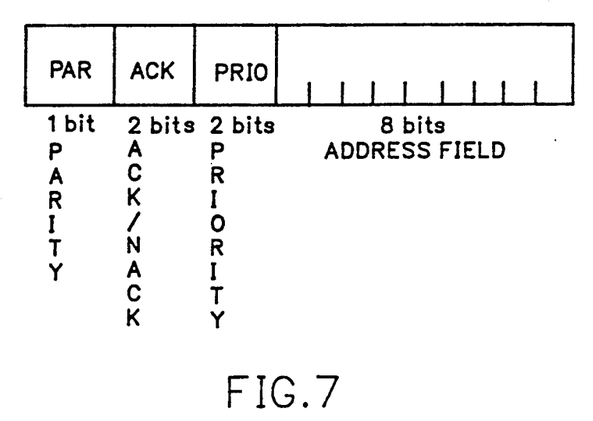
FIG. 7 illustrates an example of control word architecture.

A one parity bit field is generated and inserted into the control word to enable checking the control word integrity. Next 2-bits long field is provided to store ACK of NACK data therein, said data being to be fedback to the module entrance port to let the system know whether the tested path candidate is valid, i.e. free, or not.

ACK: means path is valid. NACK-2: means tested path invalid (unavailable) on stage 2 NACK-3: means tested path invalid on stage 3. ERR: means failed control word parity check.

Figure 8:
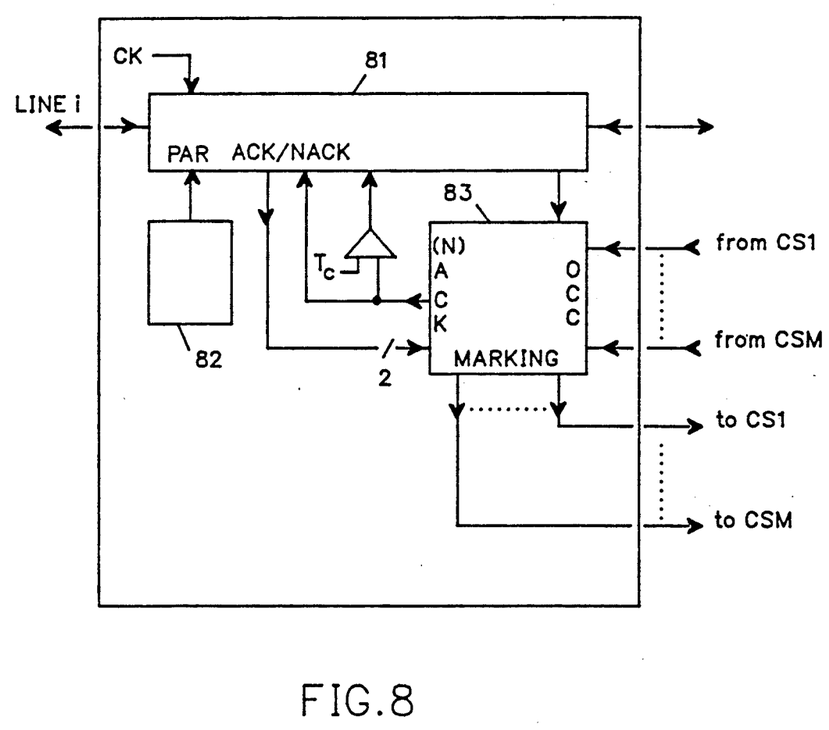
FIGS. 8-11 illustrate module components.

Represented in FIG. 8 is a block diagram for a 1st stage CE(i) circuit arrangement made for processing control words as defined with reference to FIG. 7. The control word is fed into a shift register (81). A timer (not shown) is used to generate a Time-out control set to a value Tc. Said Tc is predefined to correspond to the maximum time required for determining the concerned module exit port and to mark the corresponding crosspoint PC(i, j).

A parity checker (82) checks the integrity of the control word in every stage.

The first stage module CE circuit also includes an exit port selection circuit (83) also said marking circuit.

ACK/NACK data are made to be transferred between circuits (81) and (83). Assuming circuit (81) did not receive any NACK-3 from circuit (83) once timeout Tc is down to zero, then the control word stored into (81) is forwarded to next stage. If ACK is instead, received, then the circuit is made inactive i.e. no further cycle stealing operations are performed until next cell processing and the cell path is set.

Now, assuming a NACK-2 is fed back to this first stage module, same control word should be processed during next control cycle. For that purpose, NACK-2 is forwarded to exit port selection device (83).

Otherwise, assuming a NACK-3 is fed back to the first stage module, a new control word is processed at the next control cycle. Said control word is generated using the header of another buffered input cell contents and storing said control word into shift register (81).

Finally, assuming the fed back control word includes an ERR data, same control word is processed again at next control cycle. In case of second ERR back the cell in the receive adapter queue is discarded, and a new control word is generated for the next cell in the queue.

The exit port selection device (83) keeps permanent track of the state of exit ports occupancy for same module; of the location of exit port selected at first control cycle; and for beginning of control cycle, exit port selected at last control cycle, and exit port selected upon considered entrance port receiving a NACK-3 during last control cycle.

The selection device (83) is set to, initially, i.e. at first control cycle of first cell cycle, select the ith exit port. Then, at the xth cell cycle and first control cycle, the jth exit port is selected (j=x modulo 16).

Selection device (83) is set inactive until next cell cycle, upon receiving a ACK data. Otherwise, upon receiving a NACK or an ERR, device (83) is made to select, at next control cycle, the next free exit port following last selected exit port (modulo 16). But if an already selected exit port is designated for selection again, a NACK-3 is fed into shift register (81).

Device (83) sends a signal for marking the designated cross point, whenever an exit port was designated.

Figure 9:
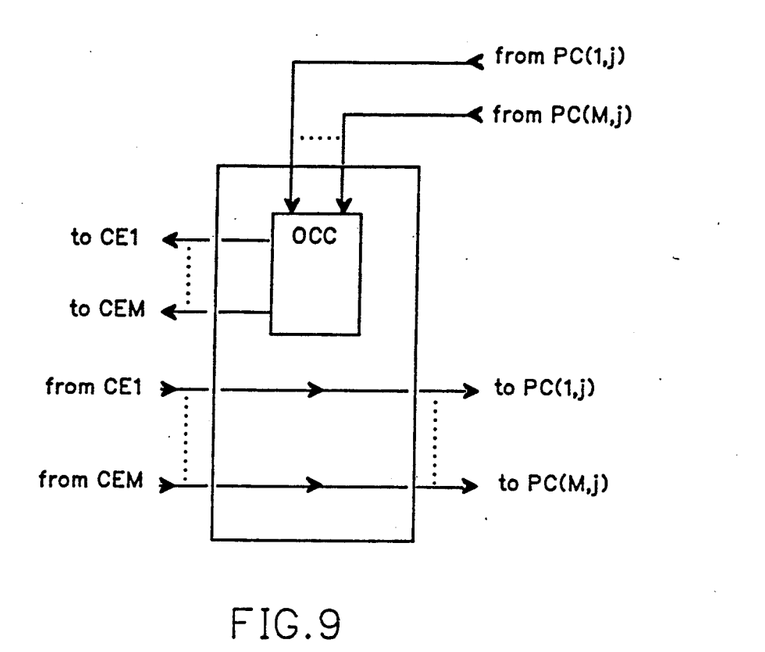

Represented in FIG. 9 is a block diagram for a first stage exit controller (CSj). As already mentioned with reference to FIG. 6, CSj gets information from CEi (for i=1, . . . , M) to control marking cross-points PC(1, j) through PC(M, j).

In addition, when a cross-point is made active and validated (marked), an occupation data OCC is forwarded to corresponding CSj device and stored in an occupation (OOC) memory. Said occupation data is also forwarded to each entrance controller (CE) and stored therein.

Figure 10:
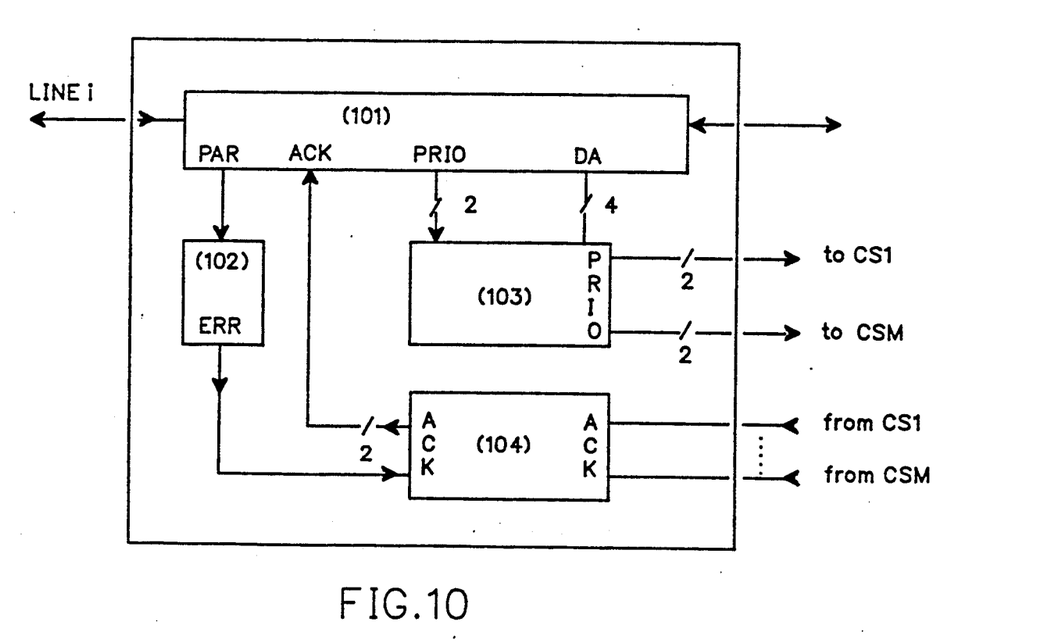
Figure 11:
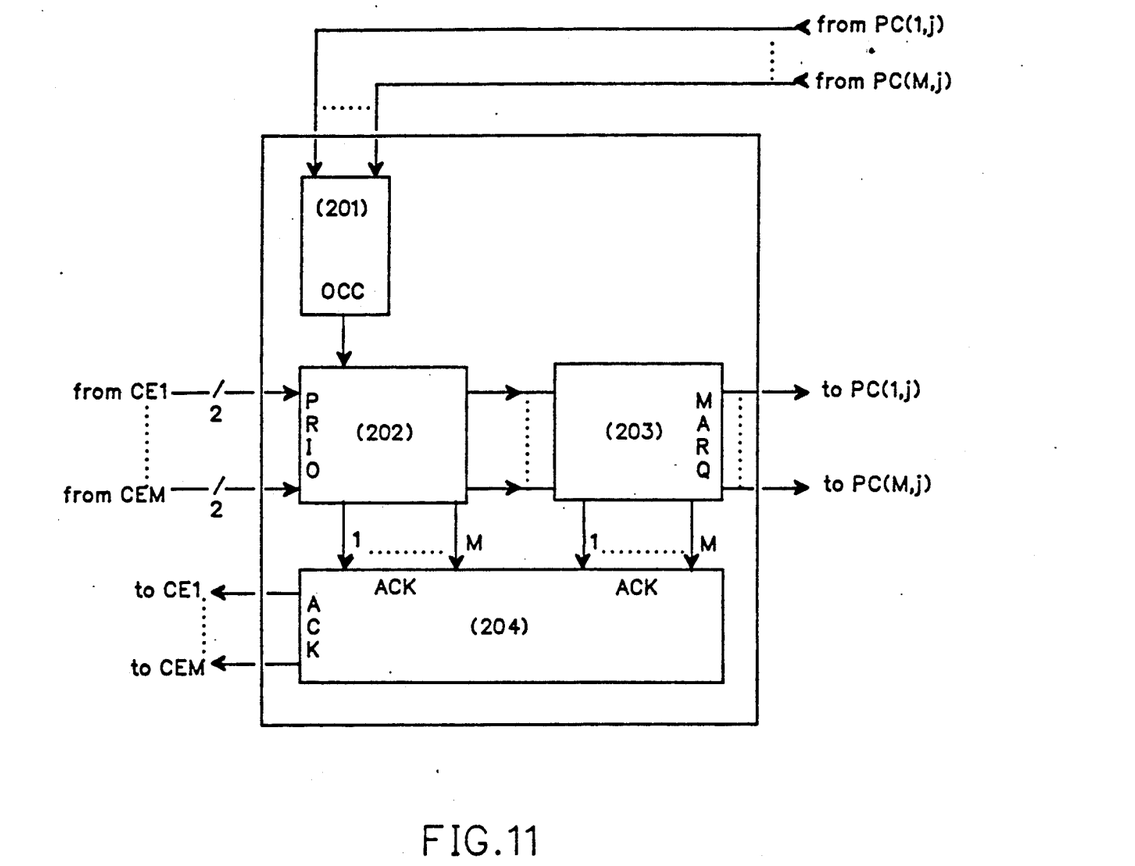

As represented in FIGS. 10 and 11, respectively, entrance (CEi) and exit (CSj) controllers for second and third stages modules are designed a little different from corresponding stage 1 circuits.

CEi, as represented in FIG. 10, includes a shift register (101) for storing the control word being processed during a control time equal to predefined value Tc. Stored in register (101) are also four address bits (DA) indicating the exit port reference number; two priority bits (PRIO) and a parity bit (PAR). After a time Tc is counted, a two-bits signal is provided through a device (104). If said signal is ACK, the control word updated with an ACK is forwarded to next stage.

In other words, if stage 2 is being processed, the control word is forwarded to stage 3; if stage 3 is being processed, the control word goes to stage 2.

Otherwise, if the provided signal is NACK-2, NACK-3 or ERR, the updated control word is fed back to preceding stage.

Parity control, performed in device (102) ERR, is made to check concordance of the parity bit (PAR) of the control word with a parity bit generated by computing the parity over the control word stored in register (101). A signal ERR or $\overline{ERR}$ is fed into device (104) accordingly.

Priority circuit (103) get a 2-bits priority data and a 4-bits exit port address. Said 2-bits priority data are forwarded to the exit controller (CS) associated to the designated exit port.

The recognizing device (104) is reset at each control cycle. It then receives an ERR signal from device (102) if a parity change occurred during transmission, and also receives an ACK or NACK from connected exit controller. If exit port is busy or NACK is received, device (104) feed a NACK-2 or NACK-3 (depending on which stage is being considered) into shift register (101). Also if circuit (104) gets an ACK, then ACK is stored into the shift register (101).

Exit Controller CSj for second or third stages is represented in FIG. 11. As in first stage CSj an occupation circuit is provided. When exit port is not free, an OCC signal is fed into priority bits controller (202). Said controller (202) sends then a NACK to recognizing device (204) for each requesting entrance port. If on the contrary $\overline{OCC}$ is on, the priority bits of control words are compared and a NACK fed into "recognizing" devices (204) for the devices failing the priority test.

Priority entrance port controller (203) is used to initially (i.e. at each cell cycle) designate a priority entrance port, on a "round robin" basis. It assigns priority to an entrance port (on a round robin basis) if said port is active and did not receive a NACK. Otherwise, the priority controller assigns priority to the first port following the former highest priority entrance port active and free of NACK. The winner generates an ACK signal and switches the corresponding cross-point on.

"Recognizing" device (204) is reset at each control cycle. Then, it gets a NACK from entrance ports non selected in competition during contention, and an ACK from the elected entrance port. Or, it may get NACK from every requesting entrance port if the exit port is busy. These data are synchronously fed back to corresponding entrance controllers.

As already mentioned with reference to FIG. 6, the data path through any module is made through crosspoint (PC). Each cross-point includes a shift register which could either be active (i.e. cross-point marked or switch on), or inactive. It is made active when receiving a pulse signal from the exit controller (CS). It remains active at least until the control word feedback. In other words, should the feedback control word include an ACK, the cross-point remains active and an OCC signal is stored into the exit controller memory (see FIG. 11). The cross-point is then marked "validated", i.e.; it remains active for the current cell cycle and next cell cycle (except during control cycles of said next cell cycle). The cell path is set.

Otherwise, should the feedback control word include a NACK or an ERR, the cross-point is set inactive. The path is reset.

Once a data cell is transferred through the switch, the path is automatically reset.

As described herein, the switch structure provides a fairly fast switching means through the use of control words for presetting, i.e. finding, reserving and then setting the path for subsequent data cell.

In addition, the modular structure enables extending the basic switching design approach to handle higher traffic rates without fully modifying the basic principles of the system; e.g. by varying the number of modules in any of the stages and/or varying the number of stages per switch structure, together with the way the modules are interconnected.

We claim:

1. A high speed digital packet switching system for transferring asynchronously received data cells, from one multistage switch entrance port to at least one cell destination dependent switch exit port, said system including:
   receive buffering means for buffering asynchronously received data cells; and,
   control means for progressively finding and setting the path for the (N+1)th cell to be transferred through said switch, while current Nth cell is being transferred, said control means including:
   control word generating means for generating a control word including a cell destination address field and for feeding said field with a destination address for the (N+1)th cell;
   cycle stealing means for stealing parts of a cell transfer cycle;
   path generating means sensitive to said cycle stealing means and to said control word generating means, for progressively setting up a path during the transfer of said Nth cell, wherein said path is to be used to transfer the (N+1)th cell.

2. A high speed digital packet switching system according to claim 1 wherein said data cells include an information section and a header section, whereby said control word destination address is derived from said cell header section.

3. A high speed digital packet switching system according to claim 1 or 2 wherein said cycle stealing means include:
   means for repetitively stealing Nth cell transfer processing cycles;
   means sensitive to said cycle stealing occurrence for triggering said (N+1)th path generating means at each cycle stealing occurrence; and,
   first means for neutralizing, within the Nth cell transfer processing, subsequent cycle stealing for cell (N+1)th path setting after finding a path, unless broadcasting (N+1)th cell is being required.

4. A high speed digital packet switching system according to claim 3 wherein said control means include means for inserting an acknowledgement ACK data into said control word upon finding a switch path for said (N+1)th cell transfer, and means for feeding said acknowledgement back to the switch entrance port for said (N+1)th cell, whereby said found path is being set.

5. A high speed digital switching system according to claim 4, wherein said multistage switch is a 3-stage switch, and said control means include:
   coding means for differently coding acknowledgement data from stage 2 NACK-2 and from stage 3 NACK-3 upon failing to find free path in stage 2 or 3 respectively;
   means for resuming path generating over stages 1 and 2, at next cycle stealing occurrence with same control word, upon said switch entrance port control means getting a NACK-2 back; or resuming said path generating operations with a different control word upon said control means getting a NACK-3.

6. A system according to claim 5 wherein said means for resuming path generating upon said entrance port control means getting a NACK-3 back, include:
   means for scanning the cells enqueued into same receive buffer means and for sequentially comparing the buffered cells destination addresses with last failed (N+1)th cell destination address; and,
   second means, sensitive to said scanning means, for neutralizing subsequent cycle steals during currently processed Nth cell upon said comparing failing to detect a buffered cell with a destination address different from failed (N+1)th cell, otherwise, holding currently investigated (N+1)th cell transfer path finding momentarily and resuming path finding process with a different enqueued cell.

7. A system according to claim 6 wherein said control means include:
   means for routing words control words within stage 1 by associating stage 1 entrance and exit ports to each other, according to a predefined scheme; and,
   means for routing the path finding control word within stages 2 and 3 according to the destination address within said control word.

8. A system according to claim 7 wherein said predefined scheme is such that each entrance port is made to route control words through different ones of the exit ports.

9. A system according to claim 8 wherein said means for routing within stages 2 and 3 include means for resolving contention situations by selecting the control word with highest priority bits in its priority field.

10. A system according to claim 5 wherein each of said switch stages includes a plurality of modules, each module including:

a matrix of cross points PCi,j, wherein i=1,...M and j=1,...M respectively refer to matrix entrance and exit ports;
   entrance controller means (CEi) connected to each module entrance port;
   exit controller means (CSj) connected to each module exit port;
   control means for feeding entrance controller means with said control word defining a stage exit port for data cell (N+1) during transfer of Nth cell, said (N+1)th cell control word being to be transferred to said stage exit port;
   control means connected to exit controller means for processing failing path determination if (N+1)th control word defined stage exit port is not free;
   acknowledgement means connected to said control means for generating and feeding acknowledgement data back to concerned entrance controller means, whereby said acknowledgement data either acknowledges finding a path through the stage for cell (N+1)th and reserves said path, or said acknowledgement data indicates busy path, whereby the path finding operations should be resumed later on.

11. A system according to claim 7 wherein said means for routing within stage 3 includes means for resolving contention situations by selecting control words in a descending order with a highest priority word being on a first entrance port.

12. A system according to claim 7 wherein said means for routing within stage 2 includes means for resolving contention situations by sequentially selecting each entrance port as the highest priority port.

13. An improved packet switching system comprising:
   a switch means having a plurality of crosspoint switches to be set up to provide transmission paths;
   a receive buffering means, coupled to the switch means, for receiving and buffering packets to be routed through the transmission paths;
   a first control means coupled to the switch means and the receive buffering means, said first control means accessing the switch means for finding and setting up the transmission paths along which the packets are routed; and
   a second control means coupled to the first control means; said second control means stealing parts of packets transfer cycle to set up a transmission path for a next packet in the receive buffering means.

* * * * *